US011653267B2

(12) United States Patent
Zhou et al.

(10) Patent No.: US 11,653,267 B2
(45) Date of Patent: *May 16, 2023

(54) RADIO ACCESS NETWORK INTELLIGENT CONTROLLER-BASED DYNAMIC TIME DIVISION DUPLEX COMMUNICATION IN A RADIO COMMUNICATION NETWORK

(71) Applicant: AT&T Intellectual Property I, L.P., Atlanta, GA (US)

(72) Inventors: Yu Zhou, Somerset, NJ (US); Varun Gupta, Mountain View, CA (US); Rittwik Jana, Montville, NJ (US); John Murray, Denville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/241,175

(22) Filed: Apr. 27, 2021

(65) Prior Publication Data

US 2021/0250813 A1 Aug. 12, 2021

Related U.S. Application Data

(63) Continuation of application No. 16/541,690, filed on Aug. 15, 2019, now Pat. No. 11,026,122.

(51) Int. Cl.
*H04J 3/16* (2006.01)
*H04J 11/00* (2006.01)
(Continued)

(52) U.S. Cl.
CPC ........... *H04W 28/16* (2013.01); *H04J 3/1694* (2013.01); *H04J 11/0023* (2013.01);
(Continued)

(58) Field of Classification Search
CPC . H04J 3/16–1694; H04J 11/0023–0066; H04J 2011/0003–0096;
(Continued)

(56) References Cited

U.S. PATENT DOCUMENTS 11,026,122 B2* 6/2021 Zhou .................... H04W 28/16
2014/0269565 A1 9/2014 Chou
(Continued)

OTHER PUBLICATIONS

Pauli, Volker et al., Dynamic TDD for LTE-A and 5G; www.nomor.de; Sep. 2015; pp. 1-8.

*Primary Examiner* — Timothy J Weidner
(74) *Attorney, Agent, or Firm* — Guntin & Gust, PLC; John G. Rauch

(57) ABSTRACT

Aspects of the subject disclosure may include, for example, a process or apparatus for receiving, by a processing system including a processor, cell traffic reports for cells of a radio communication network, performing a reconfiguration analysis to identify reconfiguration information to reconfigure the radio communication network according to changing network conditions, and communicating the reconfiguration information defining a new cell configuration for the cells of the radio communication network and communicating information defining a new reconfiguration time for the cells to substantially synchronously switch to communicating according to the reconfiguration information. The receiving the cell traffic reports, the performing the reconfiguration analysis and the communicating the reconfiguration information occur in substantially real time. Other embodiments are disclosed.

20 Claims, 10 Drawing Sheets

(51) Int. Cl.
*H04W 24/02* (2009.01)
*H04W 24/08* (2009.01)
*H04W 24/10* (2009.01)
*H04W 28/02* (2009.01)
*H04W 28/08* (2009.01)
*H04W 28/16* (2009.01)
*H04W 56/00* (2009.01)
*H04W 72/04* (2009.01)
*H04W 72/12* (2009.01)
*H04W 84/04* (2009.01)
*H04W 88/12* (2009.01)
*H04W 88/18* (2009.01)
*H04W 92/02* (2009.01)
*H04W 92/12* (2009.01)
*H04W 72/0446* (2023.01)

(52) U.S. Cl.
CPC ........... *H04W 24/02* (2013.01); *H04W 24/08* (2013.01); *H04W 24/10* (2013.01); *H04W 28/0247* (2013.01); *H04W 28/09* (2020.05); *H04W 56/0015* (2013.01); *H04W 72/0433* (2013.01); *H04W 72/0446* (2013.01); *H04W 72/0486* (2013.01); *H04W 72/1252* (2013.01); *H04J 2011/0013* (2013.01); *H04J 2011/0096* (2013.01); *H04J 2211/003* (2013.01); *H04W 84/04* (2013.01); *H04W 88/12* (2013.01); *H04W 88/18* (2013.01); *H04W 92/02* (2013.01); *H04W 92/12* (2013.01)

(58) Field of Classification Search
CPC ........ H04J 2211/001–008; H04L 5/003–0098; H04W 24/02–10; H04W 28/02–26; H04W 48/02–16; H04W 56/001–003; H04W 72/005–14; H04W 84/02; H04W 84/04–047; H04W 88/005; H04W 88/08–18; H04W 92/02–06; H04W 92/12–16; H04W 92/20–24
See application file for complete search history.

(56) References Cited

U.S. PATENT DOCUMENTS

| | | | |
|---|---|---|---|
| 2014/0307591 A1* | 10/2014 | Wang | H04W 72/1231 |
| 2015/0043390 A1 | 2/2015 | Wang et al. | |
| 2015/0055523 A1* | 2/2015 | Lei | H04W 72/04 |
| 2016/0345224 A1 | 11/2016 | Agyapong et al. | |
| 2021/0051522 A1 | 2/2021 | Zhou et al. | |

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

| Format | \multicolumn{14}{c|}{Symbol number in a slot} |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | D | F | F | U | U | D | D | D | F | F | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | \multicolumn{14}{c|}{Reserved} |
| 255 | \multicolumn{14}{c|}{UE determines the slot format for the slot based on TDD-UL-DL-ConfigurationCommon, or TDD-UL-DL-ConfigDedicated and, if any, on detected DCI formats} |

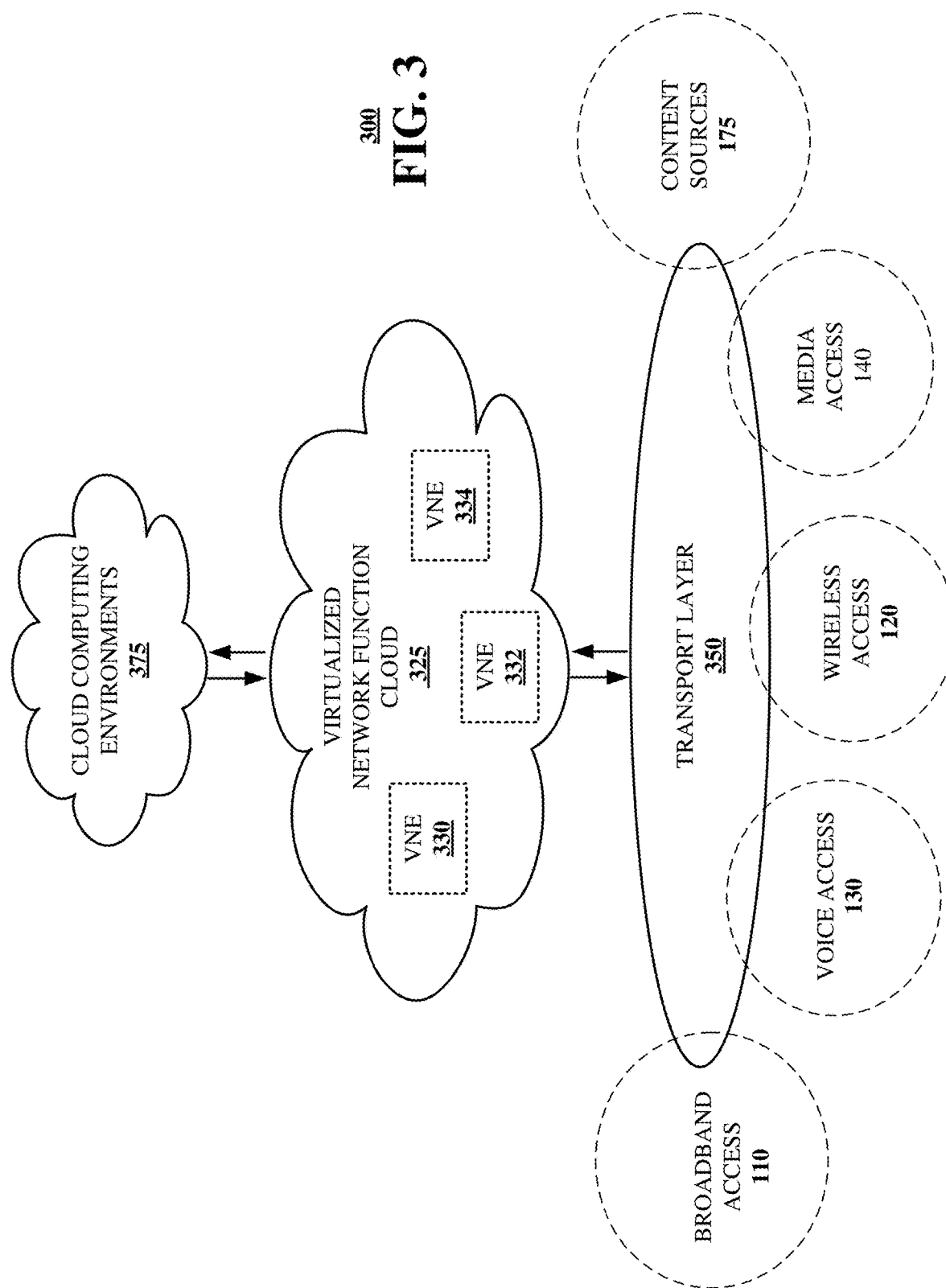

RADIO ACCESS NETWORK INTELLIGENT CONTROLLER-BASED DYNAMIC TIME DIVISION DUPLEX COMMUNICATION IN A RADIO COMMUNICATION NETWORK

CROSS REFERENCE TO RELATED APPLICATIONS

This application is a continuation of U.S. patent application Ser. No. 16/541,690 filed on Aug. 15, 2019. All sections of the aforementioned applications and patents are incorporated herein by reference in their entirety.

FIELD OF THE DISCLOSURE

The subject disclosure relates to Radio Access Network Intelligent Controller-based dynamic time division duplex communication in a radio communication network.

BACKGROUND

Communication systems employ time-division duplex (TDD) communication techniques. In a TDD system, a radio channel is used for both uplink and downlink communications during designated times.

BRIEF DESCRIPTION OF THE DRAWINGS

Reference will now be made to the accompanying drawings, which are not necessarily drawn to scale, and wherein:

FIG. 2B illustrates frame format configurations in a radio communication system.

FIG. 2C illustrates slot format configurations in an exemplary next-generation radio communication network.

FIG. 3 is a block diagram illustrating an example, non-limiting embodiment of a virtualized communication network in accordance with various aspects described herein.

DETAILED DESCRIPTION

Figure 1:
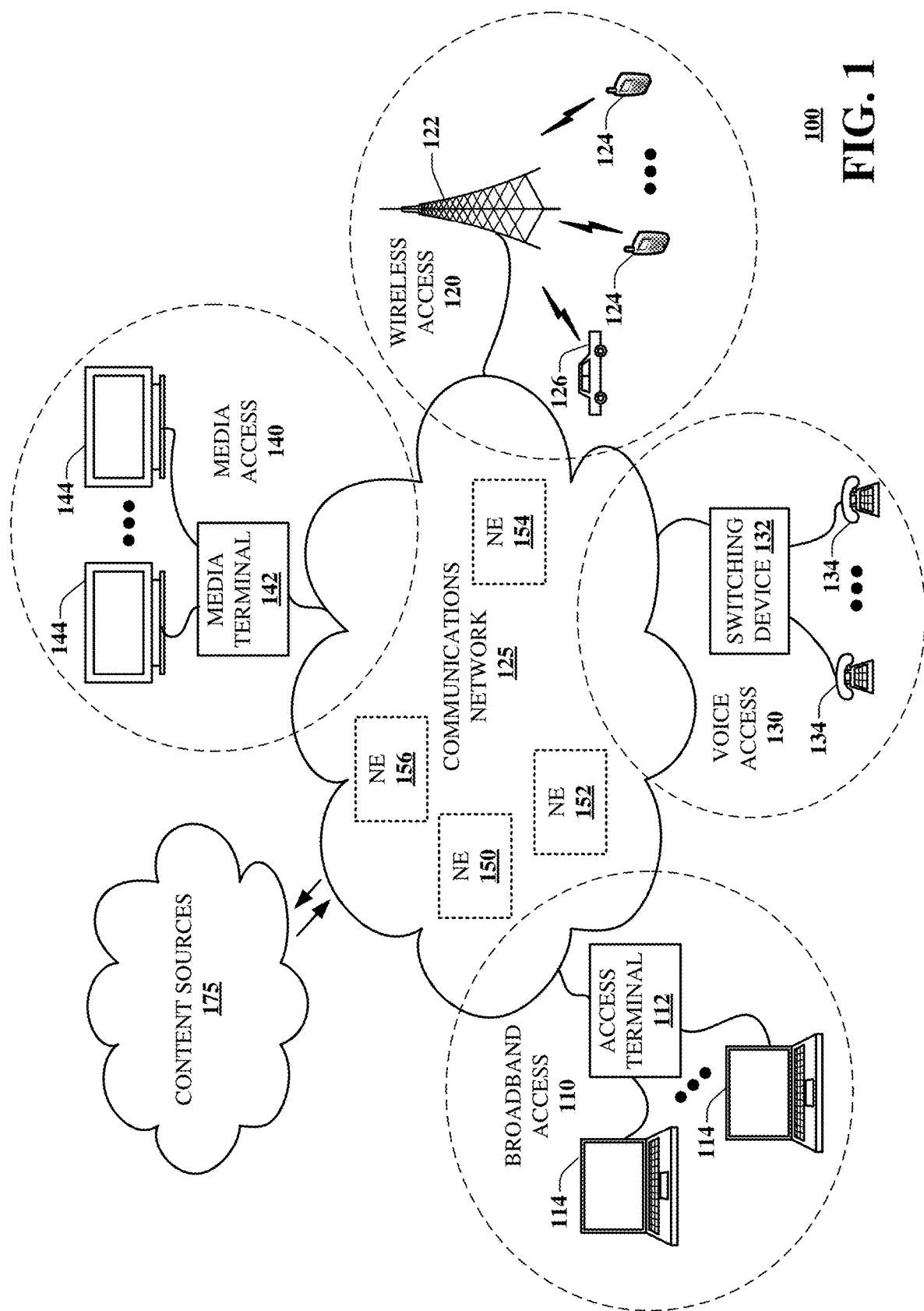
FIG. 1 is a block diagram illustrating an exemplary, non-limiting embodiment of a communications network in accordance with various aspects described herein.

The subject disclosure describes, among other things, illustrative embodiments for dynamically reconfiguring time division duplex communication, for example, in near-real time, in a radio communication system. In some embodiments, this enables the subframe configuration used by a cluster of cells to be dynamically changed, for example, in near-real time, to accommodate sudden surges in traffic volume on an uplink or downlink or in a downlink to uplink ratio. Other embodiments are described in the subject disclosure.

One or more aspects of the subject disclosure include communicating, by a processing system, a request for cell traffic reports to a plurality of distributed units (DUs) of a radio communication network and receiving cell traffic reports defining current radio traffic information for the plurality of DUs. The subject disclosure further includes in some embodiments determining an allocation of uplink and downlink resources for the plurality of DUs, wherein the determining is responsive to the cell traffic reports. The subject disclosure in some embodiments includes selecting a slot format for the plurality of DUs, wherein the selecting is based on the determined allocation of uplink and downlink resources. The subject disclosure further includes in some embodiments communicating a slot configuration instruction to the plurality of DUs, wherein the communicating the slot configuration comprises communicating information defining the selected slot format and information defining a reconfiguration time for the plurality of DUs to change from a current slot format to the selected slot format.

One or more aspects of the subject disclosure include receiving, by a processing system, cell traffic reports for cells of a radio communication network and performing a reconfiguration analysis to identify reconfiguration information to reconfigure the radio communication network according to changing network conditions. The subject disclosure in some embodiments further includes communicating the reconfiguration information defining a new cell configuration for the cells of the radio communication network and communicating information defining a new reconfiguration time for the cells to substantially synchronously switch to communicating according to the reconfiguration information, wherein the receiving the cell traffic reports, the performing the reconfiguration analysis and the communicating the reconfiguration information occur in substantially real time. Substantially real time, or near-real time, may include receiving input information, processing the information and producing output information and communicating the output information in a nearly instantaneous amount of time, such as 100 ms to 1 s.

One or more aspects of the subject disclosure include providing a cell configuration to a plurality of radio devices providing radio communication service to a respective plurality of cells of a communication network, providing a cell report configuration to the plurality of radio devices, and receiving, from the plurality of radio communication devices, cell traffic reports, wherein the cell traffic reports are received responsive to the cell report configuration. The subject disclosure in some embodiments further includes determining a traffic variation for one or more of the radio communication devices, wherein the determining the traffic variation is responsive to the cell traffic reports and determining cell reconfiguration information one or more radio devices of the plurality of radio devices; wherein the determining the cell reconfiguration information comprises determining a modification to the cell configuration responsive to the traffic variation. The subject disclosure in some embodiments includes communicating, the cell reconfiguration information to the one or more radio devices, wherein the communicating comprises communicating the cell configuration information substantially in real time with the receiving the cell traffic reports.

Referring now to FIG. 1, a block diagram is shown illustrating an example, non-limiting embodiment of a communications network 100 in accordance with various aspects described herein. For example, communications network 100 can facilitate in whole or in part providing to cells of a radio communication network configuration information, receiving cell traffic reports about factors such as uplink and downlink in cells of the radio communication network, determining reconfiguration information based on the cell traffic reports and communicating the reconfiguration information to the cells of the radio communication network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
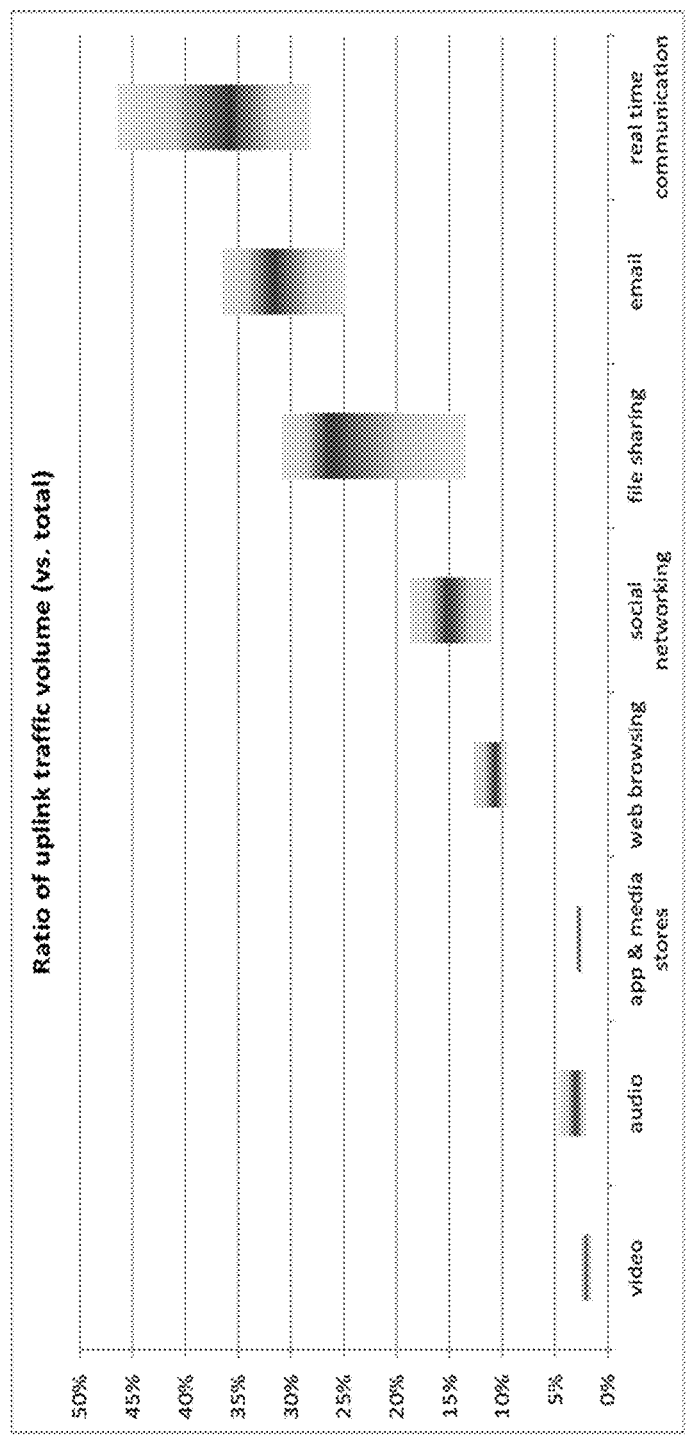
FIG. 2A is a diagram illustrating an example of uplink traffic volume in a radio communication network.

FIG. 2A is a diagram 200 illustrating estimates of user traffic in a radio communication network such as a wireless radio communication network functioning within the communication network 125 of FIG. 1. Diagram 200 shows user traffic as a ratio of uplink traffic to total traffic for different traffic types. An uplink is a radio communication channel from user equipment such as a mobile device 124 in FIG. 1 to network equipment such as base station or access point 122 in FIG. 1. A downlink is a radio communication channel from the network equipment such as base station or access point 122 in FIG. 1 to the user equipment such as a mobile device 124 in FIG. 1. Diagram 200 shows uplink to downlink traffic ratio for video traffic, for audio traffic, for application (app) and media store traffic, for web browsing traffic, for social networking traffic, for file sharing traffic, for electronic mail (email) traffic and for real time communication traffic. The information in diagram 200 is from a report entitled ITU-R M.2370-0: IMT traffic estimates for the years 2020 to 2030, published by the International Telecommunications Union in 2015.

Diagram 200 illustrates traffic asymmetry in a radio communication network. Asymmetry is a difference between average traffic volume in an uplink and average traffic volume in a downlink. Asymmetry is dependent on a variety of factors, including the nature of usage in the network (voice communication versus video, for example), the average mix of types of usage and the mix of device types in the network, the mix of users in a network, service provider subscription packages, etc.

Diagram 200 illustrates that, by conventional estimates, downlink traffic will dominate in future radio communication networks. By some estimates, downlink traffic will represent 80-90 percent of network traffic and uplink traffic will represent 10-20 percent of network traffic. The degree of asymmetry has changed as new communication networks have been developed and built out. For example, second generation (2G) networks were voice oriented so traffic between uplink and downlink was relatively symmetric. Third generation (3G) communication networks offered relatively slow data rate applications such as web browsing. Fourth generation (4G) communication networks offered relatively high data rate applications such as video streaming. Fifth generation (5G) communication networks offer even higher data rate applications such as enhanced mobile broadband (eMBB), massive Internet of Things (mIoT), ultra-reliable low-latency communication (URLLC), virtual reality (VR) and augmented reality (AR). With generation-to-generation increases in available data rates, more and more uses for available data rates have developed over time. Many of those uses, such as video streaming, are biased in favor of downlink usage, increasing asymmetry in current and future networks.

Also, it has been observed that asymmetry varies according to time of day. During morning and evening weekday traffic hours, a typical network carries relatively more voice traffic which tends to be more symmetrical. Other times of the day, there is relatively more data traffic on the downlink, so the traffic is less symmetrical.

It has also been observed that there can be sudden increases in uplink traffic. These increases can be highly localized in geography and in time. One example occurs at the place and time of a special holiday event or a sports event such as a championship match or game. At such times, downlink traffic and uplink traffic can change rapidly. First, the total volume of downlink traffic and the total volume of uplink traffic can change rapidly. Also, the ratio of uplink traffic to downlink traffic can change rapidly. For example, during a championship football game, while the teams are playing, uplink traffic volume and downlink traffic volume in the vicinity of the game may both be relatively light as fans are watching the game. The ratio of uplink traffic to downlink traffic may match that of other areas, such as 80 percent downlink traffic. During halftime, however, as fans take photos and send the photos to friends and family, uplink traffic may suddenly increase in volume as the data forming the photos is transmitted from user equipment to the network. The uplink to downlink ratio may decrease during this time. Later in halftime, as fans begin viewing online video highlights of the game, communication of video data from the network to user equipment will increase downlink traffic volume and increase the downlink to uplink traffic ratio. This variation is localized in area to the vicinity where the game or match is played, and to the time of the game or match or portions thereof. As indicated, often the variation is predictable, occurring around a planned event at a planned location.

One solution for the problem of sudden but predictable increases in traffic volume has been to deploy additional cell sites to handle the increase in traffic. For example, more cell towers can be built out in the vicinity of the special holiday event or the championship game. Microcells may be installed in a facility. Mobile equipment, such as a truck with a portable cell tower and switching equipment can be dispatched to the vicinity of the event for the time of the event. This can be effective, but it is expensive and inefficient to have to provide the additional equipment, especially for a short-term event lasting only a few hours. Moreover, some variations in traffic volume and uplink to downlink ratios may be unpredictable and depend wholly on user activities. Also, such variations can occur suddenly, with rapid spikes in uplink or downlink traffic or traffic ratio or other traffic conditions.

FIG. 2B includes a table 210 showing downlink and uplink subframe configuration in a conventional radio communication system. In particular, table 210 shows available frame configurations defined for the Long Term Evolution (LTE) 4G communication system. There are seven pre-defined uplink-downlink configurations, labelled 0-6 in table 210. Each configuration has a different number of uplink (U) and downlink (D) subframes among the 10 subframes, numbered 0-9, of a frame. Special subframes (S) are used for switching from downlink to uplink. Some LTE subframe configurations have more uplink subframes, and thus more uplink capacity, than other configurations. Some LTE subframe configurations have more downlink subframes, and thus more downlink capacity, than other configurations.

In LTE, the subframe configuration used by a cell or group of cells is set on a cell-by-cell basis. A particular subframe configuration is selected and specified for a cell or sector by a network operator. As a practical matter, LTE subframe configuration is established once and not changed, or changed very rarely. One reason for this is that, in general, adjacent cells must operate with uplink and downlink subframes synchronized. If a first cell is operating on an uplink during a time when an adjacent cell is operating on a downlink, the cells will experience inter-cell interference. Inter-cell interference occurs when transmissions in one cell block reliable communication in another cell or introduce errors in another cell. To eliminate, minimize or reduce inter-cell interference, adjacent cells are programmed by the network operator to have synchronized uplink and downlink frames in a TDD system. Changing LTE subframe configuration among the seven available configurations shown in table 210 thus is not done on a cell-by-cell basis because of the likelihood of inter-cell interference. If the network operator does desire to change the TDD configuration, it must be done for all cells of a group of cells, to prevent inter-cell interference, and the process is time consuming. As a result, such changes are, as a practical matter, rarely if ever made. Any such change of TDD configuration is not a dynamic change based on current, real time, changing traffic or network conditions.

FIG. 2C illustrates a table 220 showing some available slot format configurations in an exemplary next-generation radio communication network. In particular, table 220 shows slot format configurations for a 5G new radio (NR) communication system. Fifty-six frame formats are defined, numbered 0-55. Each frame format includes a differing number of uplink symbols, downlink symbols and flexible symbols. The slot format configurations define what activity should be occurring during a symbol. Each slot has fourteen symbols, labelled 0-13. Each symbol may be designated for downlink (D), uplink (U) or flexible (F). The larger number of possible frame formats, fifty-six in the example of FIG. 2C, allows increased flexibility in a 5G NR communication system. For a NR communication system, in an exemplary embodiment, the slot format configurations of table 220 represent a set of predetermined subframe configurations. In other embodiments, such as in other types of radio communication systems, other defined parameters and values may form a set of predetermined subframe configurations.

Figure 2D:
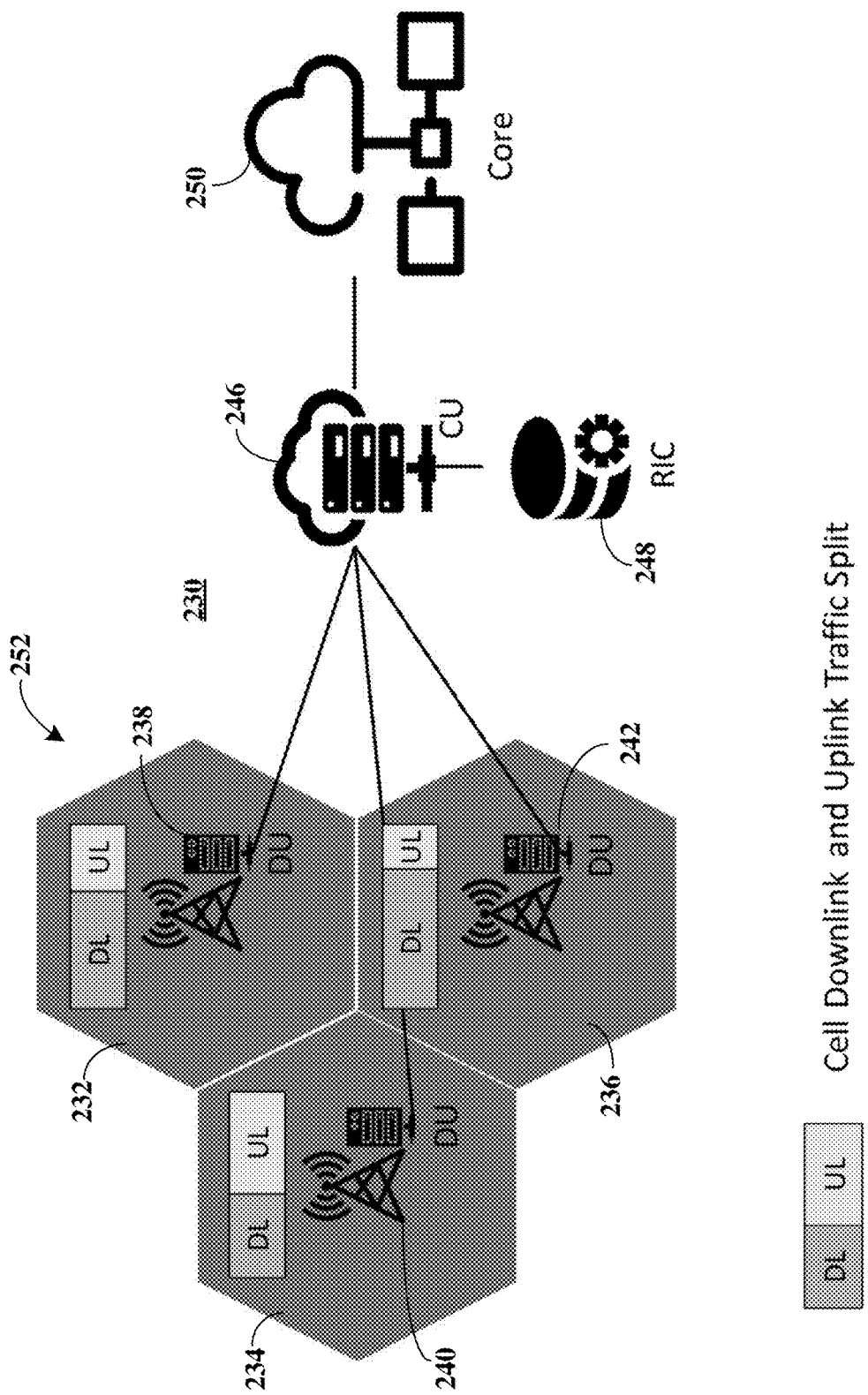
FIG. 2D depicts an illustrative embodiment of a radio communication network in accordance with various aspects described herein.

FIG. 2D depicts an illustrative embodiment of a radio communication network 230 in accordance with various aspects described herein. The radio communication network 230 in the exemplary embodiment of FIG. 2D includes three cells including a first cell 232, a second cell 234 and a third cell 236. The first cell 232 is served by a first distributed unit (DU) 238. The second cell 234 is served by a second distributed unit (DU) 240. The third cell 236 is served by a third distributed unit (DU) 242. The radio communication network 230 further includes a centralized unit (CU) 246 and a radio access network (RAN) intelligent controller (RIC) 248. The CU 246 is in data communication with the core 5G network 250. The three cells including the first cell 232, the second cell 234 and the third cell 236 together form a cluster 252.

In the exemplary embodiment of FIG. 2D, the cluster 252 includes three cells. Particular embodiments may include any suitable number of cells in cluster 252, depending on network requirements, traffic levels and other factors. In typical embodiment, the cluster 252 may include dozens or hundreds of cells. Also, the number of cells in the cluster 252 may vary over time as network usage and build-out change and develop. For example, if cell 232 is divided into multiple smaller cells to manage increasing traffic levels, the smaller cells may be added to the cluster 252, increasing the number of cells in the cluster 252.

The radio communication network 230 implements a RAN using radio access technology. In the illustrated example, Third Generation Partnership Project (3GPP) NR 5G cellular network technology is implemented in the radio communication network. However, any suitable radio access technology now known or later developed may be selected. As noted, the cluster 252 may include any suitable number of cells and it is anticipated that the cluster 252 will include a large number of cells, such as 100 cells served by 100 respective DUs.

The DUs 238, 240, 242 are logical nodes that perform a subset of eNodeB functions. Each respective DU provides mobile radio communication service to user equipment (UE) devices located in the respective cell served by the DU. In the example of FIG. 2D, each respective DU 238, 240, 242 is one DU of a cluster 252 of DUs serving respective geographically contiguous areas defined by the respective cells 232, 234, 236 and operating substantially synchronously so that uplink transmissions are substantially synchronous among the DUs 238, 240, 242 of the cluster 252 and downlink transmissions are substantially synchronous among the DUs 238, 240, 242 of the cluster 252 to limit inter-cell interference.

Each DU of the cluster 252, including first DU 238, second DU 240 and third DU 242, is in communication with the CU 246. In some embodiments, each respective DU is a remote radio head (RRH) or remote radio unit (RRU), providing radio frequency (RF) communication with UE in each respective cell. Each DU, including first DU 238, second DU 240 and third DU 242, may communicate with the CU 246 using fiber optic cable or other means of data communication.

The CU 246 provides control of the respective DUs in the radio communication network 230. The CU 246 is a logical node that performs a subset of eNodeB functions. Such functions may include transfer of user data, mobility control, radio access network sharing, positioning, session management, for example. The CU 246 provide baseband central control. The CU 246 generally controls the respective DUs. The split of functionality between the CU 246 and DUs such as DU 238, DU 240, and DU 242, is established by the network operator.

The CU 246 operates in conjunction with the RIC 248. The RIC 248 is a network element that controls certain aspects of the communication network 230. The RIC 248 provides access to some functions of the communication network 230. The RIC 248 may control operation of the CU 246 and respective DUs in the communication network 230.

In some embodiments, the RIC 248 operates in near-real time fashion and in non-real time fashion. Generally, non-real time operation occurs in a time frame greater than one second. Near-real time operation occurs in a time frame less than one second. Non-real time functions include service and policy management, RAN analytics, and others. Near-real time functions may include load-balancing, interference detection and mitigation, quality of service management and handover control. In some applications, the RIC may receive information from a DU or a CU in near-real time, such as 50-100 ms. Such information may include how many UE are connected to a DU, information about UE throughput or cell throughput, etc. For example, a DU may make a determination of its current uplink to downlink traffic ratio and communicate information about that ratio to the CU for reception by the DU, all within 50-100 ms. All such information about network usage and conditions can be passed from the respective DU or CU 246 to the RIC 248.

Because of this near-real time operation, the RIC 248 can collect and act on rapidly changing network conditions. For example, at some times in some locations, volume of traffic between UEs and one or more DUs can be bursty or can vary rapidly. In the case of a holiday or a particular event, the mix of uplink and downlink traffic can change, and can change very rapidly. The RIC 248, with near-real time access to information, can manage the communication network 230 including the CU 246 and DUs such as DU 238, DU 240 and DU 242 to respond to the changing conditions in near-real time fashion. The RIC 248 can know nearly instantaneously about current traffic conditions and cell loading for all cells in the cluster 252, for example. And the RIC 248 can control configuration of each DU in the cluster and the CU 246 to respond to rapidly changing conditions such as cell loading.

In one particular example, the RIC 248 can respond to changing traffic conditions in the communication network 230 by changing the subframe configuration of respective DUs in the cluster 252. In FIG. 2D, each cell of the cluster 252, including cell 232, cell 234 and cell 236, is illustrated with a usage graph showing relative uplink-downlink traffic split or traffic conditions at a particular moment in time. In the illustrated example, cell 234 has slightly less downlink (DL) than uplink (UL) traffic, based on the usage graph. Cell 232 has slightly heavier downlink traffic than uplink traffic, based on the usage graph. And cell 236 has substantially more downlink traffic than uplink traffic, according to the illustrated usage graph. In some embodiments, information about these usage levels will be reported to the RIC 248 and the RIC 248 can respond by reconfiguring some aspect of the communication network 230.

In some embodiments, reconfiguration of the communication network may include changing subframe configuration in the communication network 230. Referring again to FIG. 2C, that drawing figure shows an exemplary set of possible subframe configurations. Different respective subframe configurations have different numbers of downlink (D) and uplink (U) subframes. For example, subframe configuration 0 has all downlink subframes for all 14 symbol numbers. Similarly, subframe configuration 1 has all uplink subframes for all 14 symbol numbers. Typical current network traffic may be 80 percent downlink traffic. However, in the event of a sudden burst of uplink traffic in an area, such as during a sporting contest or championship game, the RIC 248 can direct all cells or DUs in cluster 252 to switch to subframe configuration 1, with all uplink subframes, in order to handle the burst of uplink traffic. Because the RIC 248 has near-real time access to information about the network, e.g., on the order of 100 msec., the RIC 248 can react to sudden changes in near-real time, such as within a range of 100 ms to 1 second.

Moreover, because of the near-real time operation of the communication network 230, the respective DUs of the cluster 252 will be reconfigured to subframe configuration 1 as directed by the RIC 248 substantially simultaneously, such as on the order of 100 msec. Because of the substantially simultaneous reconfiguration, the DUs of the cluster 252 remain synchronized in terms of uplink and downlink configuration. Because of this synchronization, no significant intercell interference is introduced when the DUs or eNodeBs or cells of the cluster 252 are reconfigured. In another example, other than substantially simultaneous reconfiguration, reconfiguration of one or more cells of a cluster or adjacent cells can occur within a predetermined synchronization threshold of time, wherein the threshold of time is an amount of time that can facilitate avoiding or mitigating intercell interference, or maintaining measured intercell interference below a predetermined threshold level, or for avoiding or mitigating any other suitable performance or quality parameter. Further, the DUs or eNodeBs can be frequently reconfigured as network traffic or loading or other communications may dictate. Even bursty traffic conditions can be accommodated while minimizing the risk of inter-cell interference.

In this manner, by making use of the near-real time operation of the RIC 248, the time domain duplexing of communication in the communication network 230 becomes truly dynamic. A traffic condition can be sensed and reported to the RIC 248, including a sudden burst of traffic volume on an uplink or downlink basis. The reporting can occur in, for example, 100 msec. The RIC 248 can detect the change in traffic conditions and, responsive to the change in traffic conditions, can direct a change in network configuration, such as selecting a new subframe configuration for the cells of the cluster 252. The change in configuration can be communicated to the CU 246 and to the respective DUs, including DU 238, DU 240 and DU 242. The DUs will then substantially simultaneously reconfigure to the new subframe configuration. There will be substantially no intercell interference.

In embodiments where the network reconfiguration involves selecting a new subframe configuration, the RIC 248 can select a subframe configuration using any suitable determination or calculation. In one example, the RIC 248 can determine respective cell traffic information from the cell traffic reports received from the cells. In another example, the RIC 248 can determine an average of downlink traffic to uplink traffic ratio within the cluster 252. Responsive to the calculated average, the RIC 248 selects a subframe configuration or otherwise reconfigures the communication network 230. The RIC 248 communicates information about the reconfiguration, such as the subframe configuration to be used by each DU in the cluster 252, to the CU 246 which communicates the information to each respective DU of the cluster 252.

In another example, when determining a reconfiguration, the RIC 248 can assign a weight value to data for a particular cell or DU if that particular cell or DU is considered to be relatively more important or less important than other cells of the cluster 252. For example, in the illustrated example of FIG. 2D, a sporting event is occurring in the area served by cell 236 and, at the illustrated time, there is heavy downlink traffic. Because of the sporting event at that time, data and performance of cell 236 might be weighted particularly heavily relative to other cells of the cluster such as cell 232 and cell 234. In another example, one cell of the cluster 252 carries a relatively large portion of traffic in the cluster and so is weighted heavily. Or, each respective cell of the cluster 252 may be weighted according to the proportion of traffic the cell carries of total cluster traffic. For example, if cell 232 carries fifty percent of all traffic in the cluster, and cell 234 and cell 236 each carry twenty-five percent of traffic in the cluster, each respective cell may be weighted accordingly when determining network reconfiguration at the RIC 248. Any suitable weighting determination may be made. A weighted average of downlink to uplink traffic ratio may be calculated for the cells of the cluster, where the downlink to uplink ratio for one or more cells of the cluster is given a weight by the RIC 248.

Moreover, downlink to uplink ratio is one example of network data that may be used to reconfigure a network by the RIC 248. Any suitable information may be used by the RIC 248 to reconfigure the network, such as the number of UE present in the cell. The RIC 248 has access to near-real time information about network performance, loading and operation. The RIC 248 can use any of this information to reconfigure any number of cells of the cluster 252 or other components of the communication network 230 and do so on a near-real time basis.

Figure 2E:
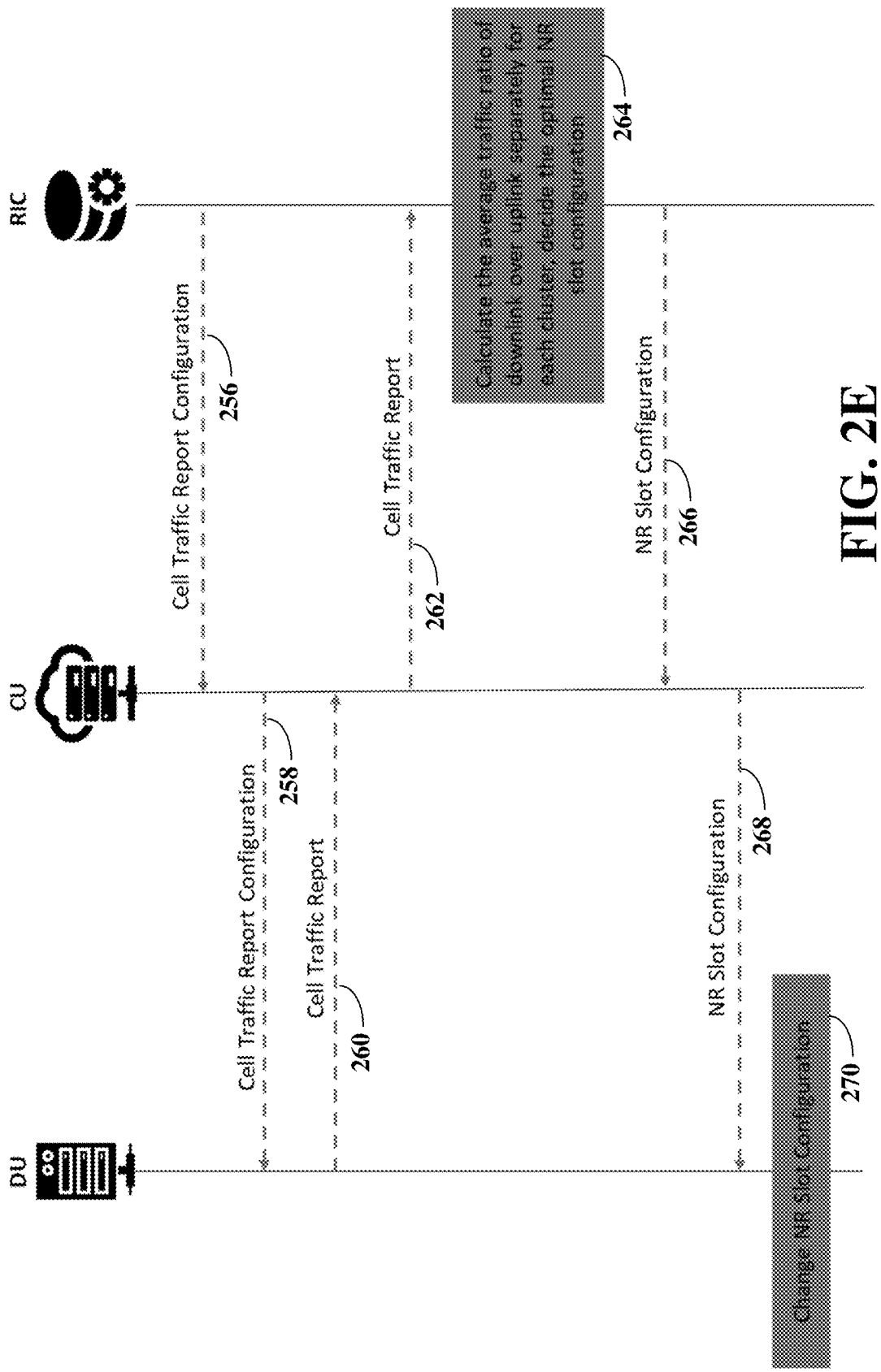
FIG. 2E depicts an illustrative embodiment of operation of a radio communication network in accordance with various aspects described herein.

FIG. 2E depicts an illustrative embodiment of operation of a radio communication network in accordance with various aspects described herein. FIG. 2E shows communication among a radio access network intelligent controller (RIC), a central unit (CU) and one or more distributed units (DUs) such as the RIC 248, the CU 246 and the DUs including DU 238, DU 240 and DU 242 of FIG. 2D. The RIC generally provides command and control operation of a radio access network including one or more CUs and a plurality of DUs. In the example of FIG. 2E, the DU is one DU of a cluster of DUs serving geographically contiguous areas and operating substantially synchronously so that uplink transmissions are substantially synchronous among the DUs of the cluster and downlink transmissions are substantially synchronous among the DUs of the cluster to limit inter-cell interference. The RIC provides cell configuration information to the CU and to the DUs of the cluster and other equipment in the network. In one example, the RIC provides subframe configuration, such as one of the predetermined subframe configurations illustrated in FIG. 2C. The configuration information provided by the RIC permits the DUs to operate to reliably provide communication services to cells used by the DUs, including minimizing inter-cell interference among cells of the cluster.

At step 256, the RIC sends a Cell Traffic Report Configuration to the CU. The Cell Traffic Report Configuration may be any suitable communication and may include information such as what information each DU should report to the RIC, how frequently to report, such as every 10 ms or every 100 ms, or even a schedule for reporting specified information. The Cell Traffic Report Configuration may include a request for cell traffic reports from each DU or a subset of DUs in a radio communication network. Alternatively, the Cell Traffic Report Configuration may include any suitable command and control information or request for information from the CU or DUs. Information that should be reported by the DU may include, for example, a number of UE registered with the DU, uplink and downlink loading, communication throughput, other key performance indicators, etc. At step 258, the CU will forward the Cell Traffic Report Configuration to each DU, for example to each DU of a specified cluster of DUs.

At step 260, the DU communicates a Cell Traffic Report to the CU responsive to receiving the Cell Traffic Report Configuration. The Cell Traffic Report may include any suitable information specified by the RIC. Examples include current downlink to uplink traffic ratio, information about current downlink traffic and uplink traffic, how many users are currently connected to the DU, etc. Any other information may be specified by the RIC and collected and reported by the DU, including historical information maintained at the DU such as traffic loading over time or information about throughput or any suitable key performance indicator. The information reported will depend on the reconfiguration analysis to be performed by the RIC. At step 262, the Cell Traffic Report is forwarded by the CU to the RIC. In some embodiments, each respective DU in a cluster provides a Cell Traffic Report to the RIC. In some embodiment, each Cell Traffic Report is provided at the periodicity or frequency specified by the RIC in the Cell Traffic Report Configuration, and includes the information specified by the RIC. In other embodiments, the RIC instructs the cells to provide the Cell Traffic Reports according to a schedule, such as every second or according to any other measure. The Cell Traffic Report may be provided and received in near-real time, such as in 100 ms to 1 second.

At step 264, the RIC performs a reconfiguration analysis to identify needed reconfiguration in the communication network according to changing network conditions. The changing network conditions may include changes in uplink traffic or changes in downlink traffic, either instantaneous or averaged over time or location; changing downlink to uplink traffic ratios; changing uplink to downlink ratios; changing or new peak traffic value or changing median traffic values; changing numbers of UE in one or more cells; or any other dynamic information about network performance or configuration. For example, the RIC may process the information contained in the respective Cell Traffic Reports received from the DUs. In the example of FIG. 2E, the RIC calculates an average traffic ratio of downlink traffic to uplink traffic separately for each DU in a cluster or for each cluster in the communication network, or some combination of these. In other embodiments, some traffic-related feature other than downlink traffic and uplink traffic may be used for the reconfiguration analysis. Examples include throughput, number of UE connected to the DU or some key performance indicator of interest. For each cluster, the RIC will decide the optimal configuration. For example, the RIC will determine what downlink to uplink configuration to specify for the cluster. Responsive to this determination, the RIC will select a subframe configuration. This may be done, for example, using the permitted subframe configurations of FIG. 2C.

The RIC may use any suitable calculation, data processing or decision tree in the reconfiguration analysis. For example, the RIC may assign a weight to the information of one or more cells of a cluster. The weight may be based on a particular relative importance of the one or more cells. If a cell is serving a particular facility such as a sports facility or a hospital, the data for the cell may be weighted relatively heavily. If the cell is currently serving a high-priority event, such as a championship sporting event, the cell may be weighted relatively heavily. If the cell is currently lightly populated, i.e., the cell has relatively few UE connected, the cell may be weighted relatively lightly compared to other cells. Any suitable weighting scheme may be used, and the weights may be used to weight any data or factors or calculation. In the example of FIG. 2E, the assigned weights are used to weight downlink to uplink traffic ratios when determining a weighted average traffic ratio for the cluster. Step 264 includes selecting a reconfiguration for the cluster. In the example of FIG. 2E, the RIC determines a NR slot configuration or a slot format.

At step 266, reconfiguration information is communicated from the RIC to the CU. In the example of FIG. 2E, the NR slot configuration is communicated to the CU by the RIC. At step 268, the CU communicates the reconfiguration to the respective DUs of the communication network. In the example of FIG. 2E, the NR slot configuration is communicated by the CU to the respective DUs. In some examples, depending on the nature of the reconfiguration, the reconfiguration information may be identical for all DUs of the cluster. For example, where the reconfiguration information includes the NR slot configuration, the slot configuration will be identical for all DUs of the cluster. All DUs must be synchronized for downlink and uplink communication and so will use the same slot configuration. In other examples, the reconfiguration information may be different for some or all DUs of the cluster.

At step 270, the DU applies the reconfiguration information to reconfigure the DU. In the illustrated example, the NR slot configuration is changed according to the reconfiguration information. Other reconfiguration changes may be made as well. In some embodiments, the reconfiguration information may be provided to the DUs substantially in real time or in near-real time, such as in 100 msec. The slot configuration will be changed for all DUs substantially simultaneously for all DU in a cluster to minimize intercell interference.

In some embodiments, the process of FIG. 2E can be performed repetitively so as to be truly dynamic. After step 270, control may return to step 258, for example, where the DUs continually provide Cell Traffic Reports to the RIC. This may be done, for example, periodically or according to a schedule. Moreover, the frequency of adjustment may be varied based on any suitable factor, such as traffic volume, uplink to downlink ratio, time factors such as time of day of geographical factors such as relatively heavy or light traffic, or traffic peaks, in one or more cells. As the RIC determines that additional subsequent reconfigurations are necessary, subsequent reconfiguration information is sent to the DUs to reconfigure the DUs of a cluster. In this way, as network conditions change in the communication network, the DUs of the network can be reconfigured to adapt to the changing conditions. Adaptation can be done substantially in real time or on a near-real time basis to accommodate even the most rapid changes in the network.

While for purposes of simplicity of explanation, the respective processes are shown and described as a series of communication processes in FIG. 2E, it is to be understood and appreciated that the claimed subject matter is not limited by the order of the communication processes, as some communication processes may occur in different orders and/or concurrently with other communication processes from what is depicted and described herein. Moreover, not all illustrated communication processes may be required to implement the methods described herein.

Referring now to FIG. 3, a block diagram 300 is shown illustrating an example, non-limiting embodiment of a virtualized communication network in accordance with various aspects described herein. In particular, a virtualized communication network is presented that can be used to implement some or all of the subsystems and functions of communication network 100, the subsystems and functions of communication network 230 of FIG. 2D, and the operations illustrated in FIG. 2E. For example, virtualized communication network 300 can facilitate in whole or in part receiving wireless access traffic reports, determining reconfiguration information such as a new subframe configuration and communicating the reconfiguration information, all in near-real time.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
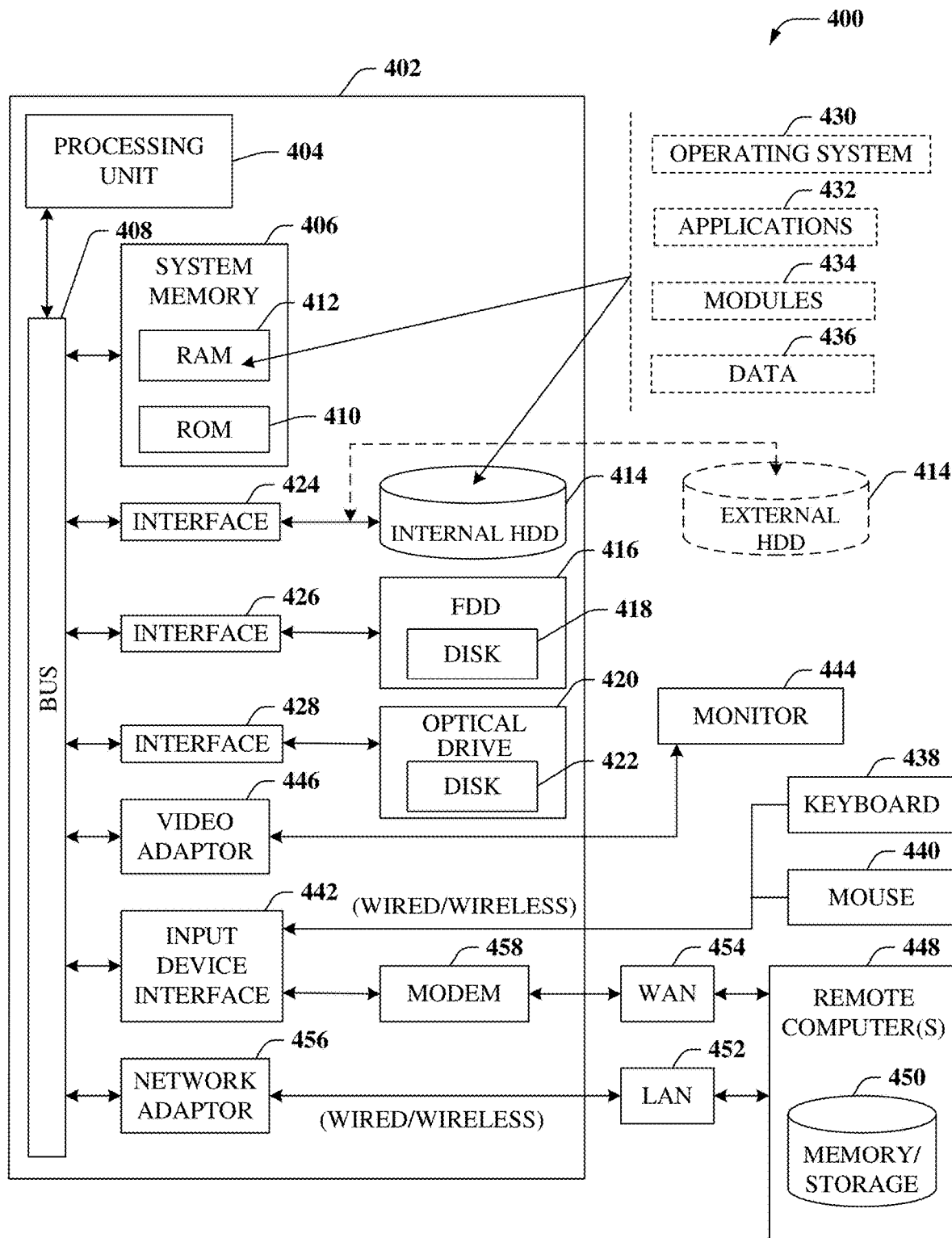
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing dynamic time division duplex communication in a network including the one or more aspects of the computing environment, such as by receiving wireless access traffic reports, determining reconfiguration information such as a new subframe configuration and communicating the reconfiguration information, all in near-real time.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
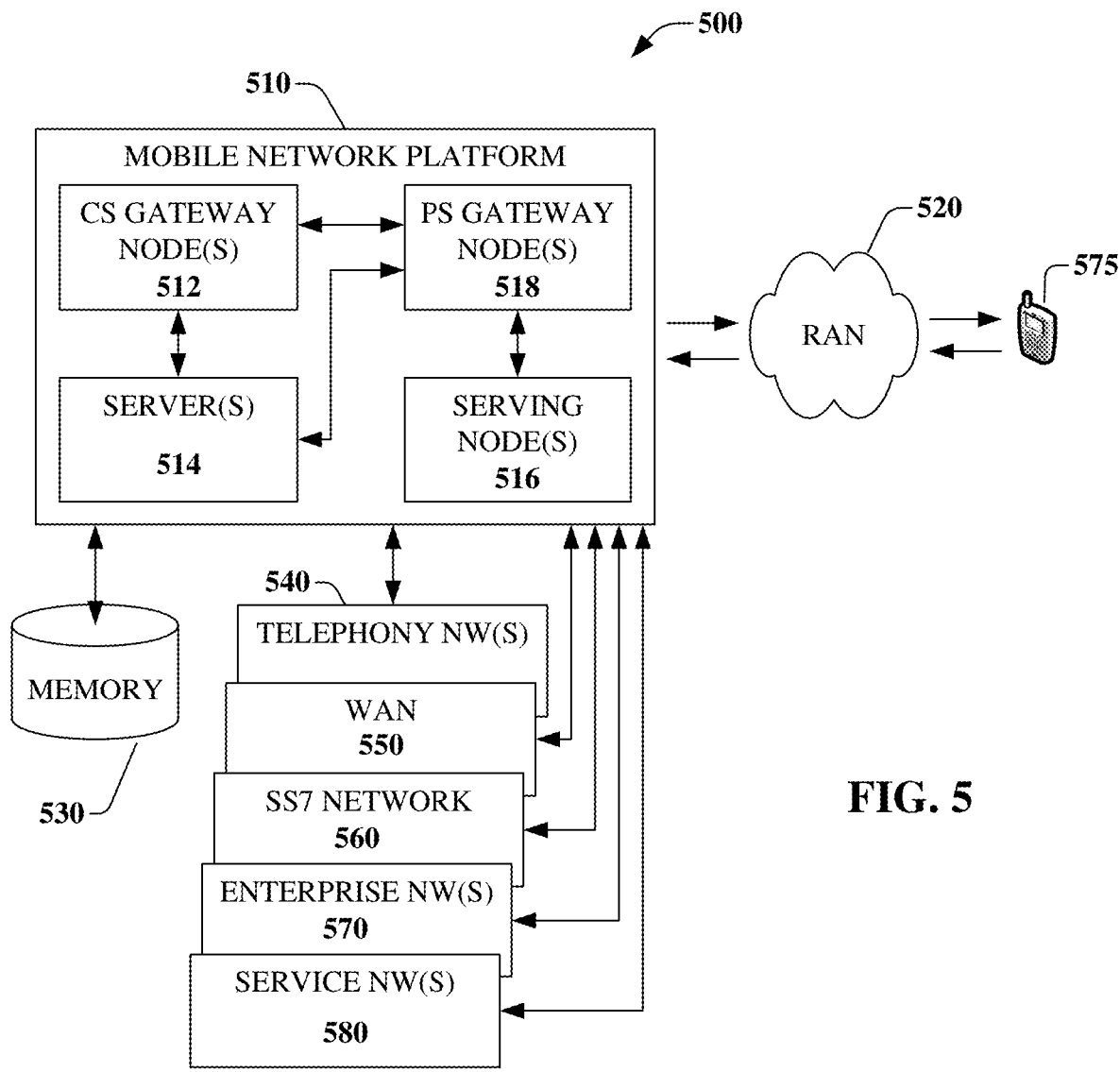
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part a process of receiving information such as wireless access traffic reports about uplink and downlink traffic in a cluster of cells in a wireless network, determining reconfiguration information such as a new subframe configuration that will vary network capacity according to changing traffic conditions and communicating the reconfiguration information, all in near-real time. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
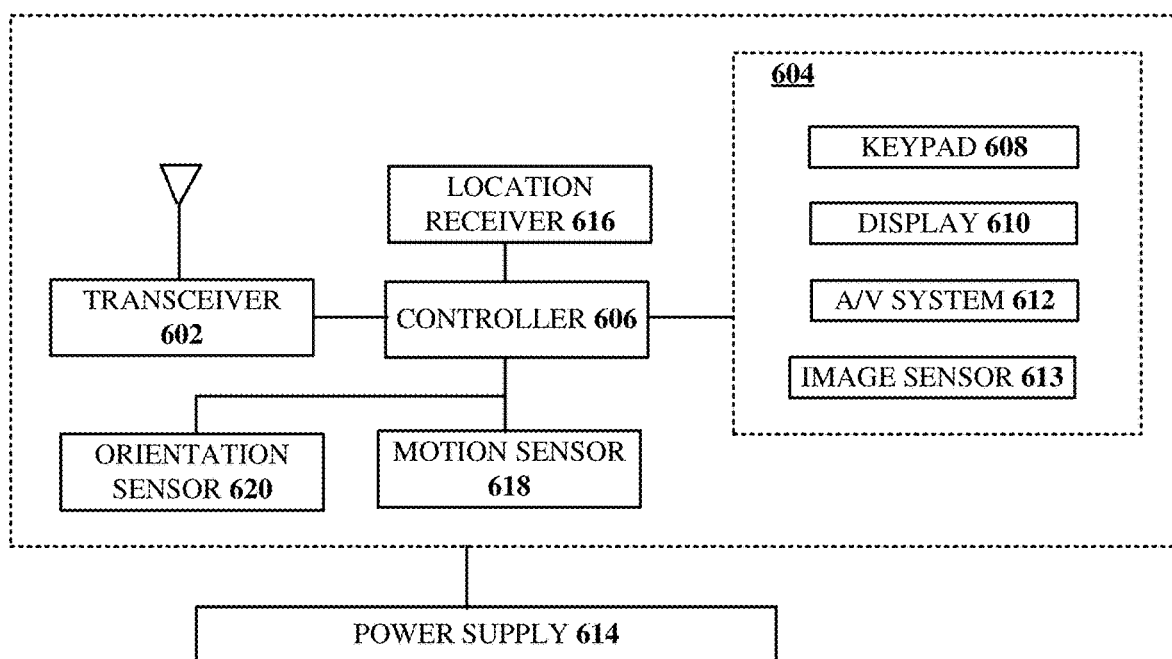
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125, a process of receiving information such as wireless access traffic reports in a network such as communications network 125 about uplink and downlink traffic from mobile devices such as mobile devices 124 operating among a cluster of cells in a wireless network, determining reconfiguration information such as a new subframe configuration that will vary network capacity according to changing traffic conditions and communicating the reconfiguration information, all in near-real time.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

communicating, by a processing system of a radio access network (RAN) intelligent controller (RIC), the processing system including a processor, a request for cell traffic reports to a plurality of cells of a RAN cluster of cells of a radio communication network;

performing, by the processing system of the RIC, a reconfiguration analysis to identify reconfiguration information to reconfigure the RAN cluster of cells of the radio communication network according to changing network conditions, wherein the reconfiguration analysis is based on received cell traffic reports at the RIC responsive to the request for cell traffic reports for the plurality of cells of the RAN cluster of cells;

communicating, by the processing system of the RIC, information defining a new cell configuration;

communicating, by the processing system of the RIC, a cell reconfiguration time for the RAN cluster of cells to switch to communicating according to the reconfiguration information the cell reconfiguration time comprising a time for the RAN cluster of cells to substantially synchronously switch to communicating according to the reconfiguration information to maintain measured inter-cell interference among the RAN cluster of cells below a predetermined threshold level; and communicating the cell reconfiguration time to the RAN cluster of cells; and wherein the communicating the request for cell traffic reports, receiving the cell traffic reports, the performing the reconfiguration analysis and the communicating the cell reconfiguration time occur in substantially real time.

2. The method of claim 1, wherein the performing the reconfiguration analysis comprises selecting, by the processing system, a new slot configuration to accommodate a change in communication traffic in the RAN cluster of cells of the radio communication network.

3. The method of claim 2, further comprising:
receiving, by the processing system, cell traffic reports for cells of the RAN cluster of cells of the radio communication network, wherein the cells of the RAN cluster of cells communicate the cell traffic reports responsive to the request for cell traffic reports; and
determining, by the processing system, the change in communication traffic in the RAN cluster of cells of the radio communication network based on the cell traffic reports.

4. The method of claim 2, wherein the selecting the new slot configuration comprises:
determining, by the processing system, an average traffic ratio for the RAN cluster of cells of the radio communication network; and
selecting, by the processing system, a new subframe configuration for the RAN cluster of cells, wherein the selecting the new subframe configuration is responsive to the average traffic ratio.

5. The method of claim 4, wherein the selecting the new subframe configuration comprises:
determining, by the processing system, an average downlink to uplink ratio for the RAN cluster of cells from respective downlink to uplink traffic ratios for respective cells of the RAN cluster of cells; and
selecting a subframe configuration as the new subframe configuration from a set of predetermined subframe configurations based on the average downlink to uplink ratio.

6. The method of claim 4, wherein the selecting the new subframe configuration comprises:
determining, by the processing system, from the cell traffic reports, respective cell traffic information for respective cells of the RAN cluster of cells;
weighting, by the processing system, the respective cell traffic information to produce weighted cell traffic information;
determining, by the processing system, a weighted average cell traffic value for the RAN cluster of cells from the respective weighted traffic information; and
selecting a subframe configuration as the new subframe configuration from a set of predetermined subframe configurations based on the weighted average cell traffic value.

7. The method of claim 1, wherein the performing the reconfiguration analysis comprises:
identifying, by the processing system, a change in number of user equipment (UE) devices connected to the RAN cluster of cells of the radio communication network; and
selecting, by the processing system, a new slot configuration to accommodate the change in number of UE devices connected to the RAN cluster of cells of the radio communication network.

8. The method of claim 1, further comprising:
defining, by the processing system, the RAN cluster of cells including a plurality of adjoining cells serving geographically contiguous areas; and
communicating, by the processing system, a cell traffic report configuration to at least some cells of the RAN cluster of cells, wherein the communicating the cell traffic report configuration comprises instructing the at least some cells to provide the cell traffic reports, including defining a reporting schedule for the at least some cells to provide the cell traffic reports.

9. A non-transitory machine-readable medium, comprising executable instructions that, when executed by a processing system including a processor, facilitate performance of operations, the operations comprising:
receiving, from a plurality of radio devices which provide radio communication service to a plurality of cells of a communication network, cell traffic reports, wherein the cell traffic reports are received responsive to a cell report configuration including a request for cell traffic reports from the plurality of radio devices, wherein respective cell traffic reports include respective cell traffic data for respective cells of the plurality of cells of the communication network;
determining a relative importance of one or more selected cells based on a particular geographic location of the one or more selected cells or a particular time of day;
assigning a weight value to selected cell traffic data of the one or more selected cells according to the relative importance of the one or more selected cells;
determining a traffic variation for one or more radio devices of the plurality of radio devices, wherein the determining the traffic variation is based on the cell traffic reports;
determining a modification to a cell configuration of the plurality of cells of the communication network responsive to the traffic variation and the weight value; and
communicating, cell reconfiguration information to the one or more radio devices, the cell reconfiguration information being based on the modification to the cell configuration, wherein the communicating comprises communicating the cell reconfiguration information substantially in real time with receiving the cell report configuration and the receiving the cell traffic reports.

10. The non-transitory machine-readable medium of claim 9, wherein the operations further comprise:
determining an initial subframe configuration for the plurality of radio devices;
providing the initial subframe configuration to the plurality of radio devices;
determining an updated cell configuration responsive to traffic variation for the one or more of the radio devices; and
providing the updated cell configuration to the one or more of the radio devices with the cell reconfiguration information.

11. The non-transitory machine-readable medium of claim 9, wherein the operations further comprise:
receiving, with the cell traffic reports, information about uplink radio communications and downlink radio communications by respective radio devices of the plurality of radio devices;
determining an average traffic value for the plurality of radio devices based on the information about uplink radio communications and downlink radio communications; and
selecting an updated subframe configuration for the plurality of radio devices, based on the average traffic value and to reduce inter-cell interference among the plurality of cells of the communication network.

12. The non-transitory machine-readable medium of claim 11, further comprising averaging the information about uplink radio communications and downlink radio communications to determine the average traffic value for the plurality of radio devices, including determining an average traffic ratio of downlink to uplink traffic for the plurality of radio devices.

13. The non-transitory machine-readable medium of claim 9, wherein the operations further comprise:
receiving, with the cell traffic reports, information about respective numbers of user equipment (UE) devices connected to respective radio devices of the plurality of radio devices,
and wherein the determining the cell reconfiguration information comprises determining a modification to the cell configuration responsive to the respective numbers of UE devices.

14. A radio access network (RAN) intelligent controller (RIC) for a radio access network (RAN), comprising:
a processing system including a processor; and
a memory that stores executable instructions that, when executed by the processing system, facilitate performance of operations, the operations comprising:
receiving cell traffic reports defining current radio traffic information for a plurality of distributed units (DUs) of the RAN;
determining a selected slot format for the plurality of DUs, wherein the determining is responsive to the cell traffic reports;
communicating, by the processing system, a slot configuration instruction to the plurality of DUs, the slot configuration instruction including information defining the selected slot format; and
communicating information defining a reconfiguration time for the plurality of DUs to change from a current slot format to the selected slot format, wherein the receiving the cell traffic reports, and the communicating the slot configuration instruction occur substantially in real time, wherein the plurality of DUs are responsive to the reconfiguration time to change from the current slot format to the selected slot format substantially simultaneously to maintain measured inter-cell interference among the plurality of DUs below a predetermined threshold level.

15. The RIC of claim 14, wherein the operations further comprise:
communicating, by the processing system, a request for cell traffic reports to a plurality of DUs of the RAN, wherein the plurality of DUs communicate the cell traffic reports responsive to the request for cell traffic reports.

16. The RIC of claim 14, further comprising:
determining an allocation of uplink and downlink resources for the plurality of DUs responsive to the cell traffic reports, wherein the determining an allocation of uplink and downlink resources comprises, determining an average of downlink to uplink traffic ratio for the plurality of DUs.

17. The RIC of claim 16, wherein the determining an average of downlink to uplink traffic ratio for the plurality of DUs comprises determining a weighted average of downlink to uplink traffic ratio for the plurality of DUs.

18. The RIC of claim 17, wherein the determining an allocation of uplink and downlink resources comprises, determining a weight for each respective DU of the plurality of DUs, determining a weighted average for the plurality of DUs, and selecting a slot format for the plurality of DUs based on the weighted average.

19. The RIC of claim 18, wherein the selecting a slot format for the plurality of DUs comprises determining an identical slot configuration for all DUs of the plurality of DUs.

20. The RIC of claim 14, further comprising;
detecting, by the processing system, a change in communication traffic in plurality of DUs of the RAN; and
selecting, by the processing system, a new slot configuration to accommodate the change in communication traffic in the plurality of DUs of the RAN.

* * * * *